United States Patent [19]

Yarczower

[11] 4,376,349
[45] Mar. 15, 1983

[54] NIGHT TIME FISHING AID

[76] Inventor: Donald J. Yarczower, 84 Weed Ave., Staten Island, N.Y. 10306

[21] Appl. No.: 207,766

[22] Filed: Nov. 17, 1980

[51] Int. Cl.³ .............................................. A01K 97/12
[52] U.S. Cl. ......................................... 43/17; 43/17.5; 43/25
[58] Field of Search ........................... 43/17, 17.5, 25; 340/668, 573; 362/120, 802, 431

[56] References Cited

U.S. PATENT DOCUMENTS

| 3,624,689 | 11/1971 | Rizzo | 43/17 |
| 3,861,688 | 1/1975 | Butler | 340/668 |
| 3,918,191 | 11/1975 | Williamson | 362/802 |
| 3,959,910 | 6/1976 | Montgomery | 43/17 |
| 4,020,578 | 5/1977 | Hope | 43/17 |
| 4,266,217 | 5/1981 | Kao et al. | 340/668 X |

FOREIGN PATENT DOCUMENTS 2163299  7/1972  Fed. Rep. of Germany .......... 43/17

Primary Examiner—Nicholas P. Godici
Assistant Examiner—Charles L. Willis

[57] ABSTRACT

A device mountable upon a tip of a fishing rod for indicating to a fisherman when a fish is nibbling at a baited hook; the device including a case snap-fitted to the rod and containing a dry cell battery and switch in circuit with a lamp for shining in the dark.

1 Claim, 5 Drawing Figures

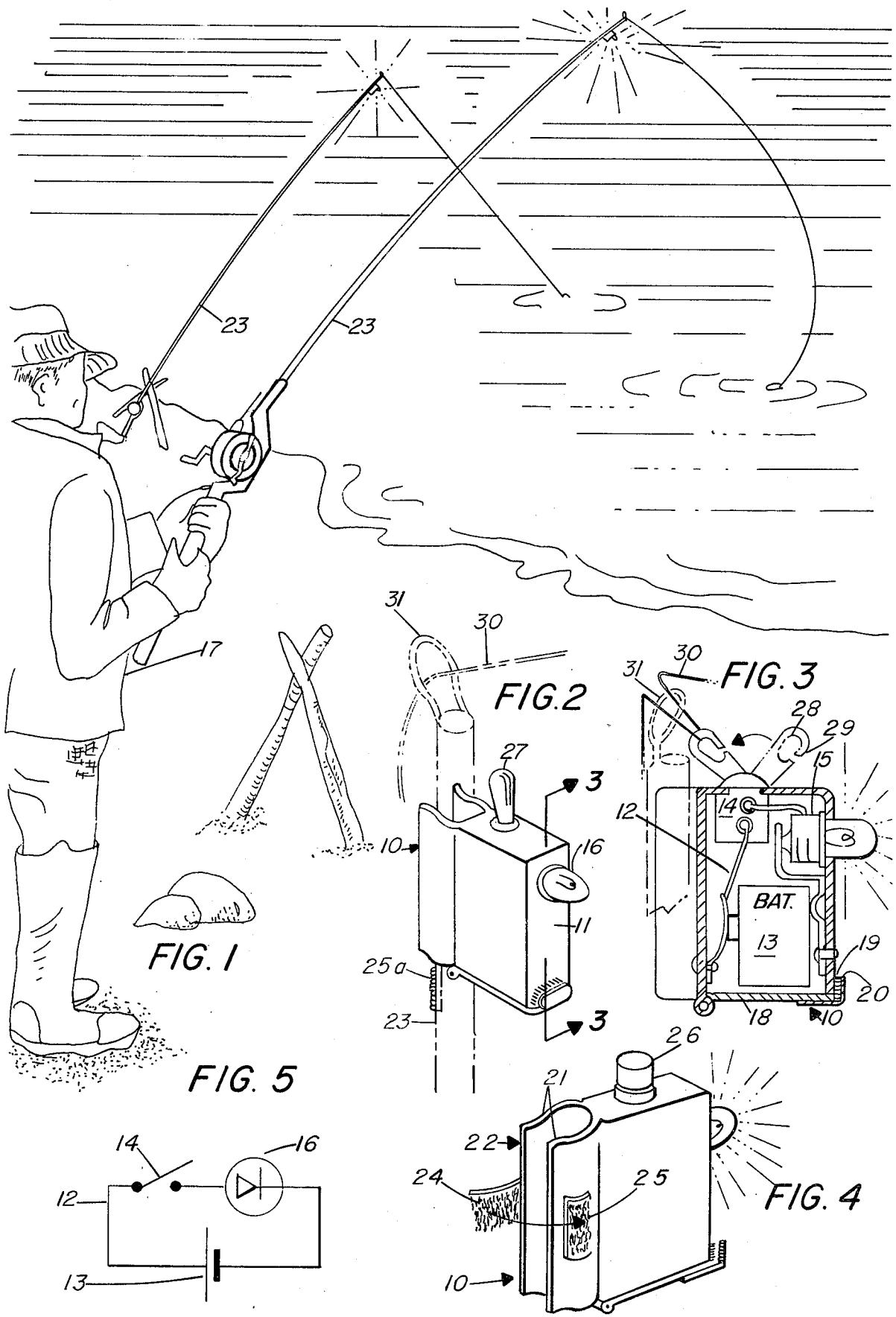

NIGHT TIME FISHING AID

BACKGROUND OF THE INVENTION

This invention relates generally to accessories for sport fishermen.

It is well known that when fishing at night from a boat or in a surf, it is difficult for the fisherman to know when a fish is striking the bait, because he cannot see the fishing pole tip being flexed in the darkness, as the fishing line is being tugged by the fish, so that the fish thus steals the bait without getting hooked. This is particularly disadvantageous when a fisherman has set up several rods and tries to tend any where a fish may be biting. Accordingly this situation is in need of an improvement.

SUMMARY OF THE INVENTION

Therefore it is a principal object of the present invention to provide a night time fishing aid which visually indicates to a fisherman when a fish is striking.

Another object is to provide a night time fishing aid which is especially advantageous when a fisherman has several fishing lines in use at a same time, so that the fisherman may thus know which of the lines should be immediately tended, because a fish is striking the line bait.

Another object is to provide a night time fishing aid which includes a lighted lamp that is seen to move back and forth in the darkness as the tip of the fishing pole is flexed by the tugging fish.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a perspective view of fishing rods employing the invention during night fishing.

FIG. 2 is an enlarged perspective view of one design of the invention.

FIG. 3 is a cross sectional view on line 3—3 of FIG. 2, and showing a slight modification thereof.

FIG. 4 is a perspective view of another design thereof, using a pushbutton.

FIG. 5 is an electrical circuit diagram of the invention.

DETAILED DESCRIPTION OF THE PREFERRED EMBODIMENT

Referring now to the drawing in greater detail, the reference numeral 10 represents a night time fishing aid, according to the present invention, wherein there is a case 11 containing an electrical circuit 12 between a replaceable dry cell battery 13, an electric switch 14 and a socket 15 of a light emitting diode or small, colored lamp bulb 16 that protrudes outwardly of the case so that it can be seen by a fisherman 17. A hinged door 18, normally held closed by loop pile fastener elements 19 and 20, closes an access opening for changing the battery.

The case includes a pair of flexible jaws 21 along one vertical end edge so as to form a clip 22 for clipping around an outer end or tip of the fishing rod or pole 23. A conventional fishing pole tapers toward the tip, so that the tip is more flexible than a remainder of the pole. As shown in FIG. 4, the clip can include loop pile fastener elements 24 and 25 that extend around the pole held in the clip, the elements preventing the night time fishing aid from being shaken off the pole in case of violent shaking of the pole. Additionally another element 25a may also be adhered permanently to the pole for preventing the aid 10 from sliding down the pole in case of becoming loosened.

As shown in FIG. 4, the switch 14 may be operated by a push button 26 when setting up the device for use. Then in operative use, the fisherman handling one, or several fishing poles as shown in FIG. 1, needs only to watch the lamp lights in the darkness, so to see if any is moving back and forth, thus indicating a fish tugging on the bait.

Alternately the switch may be operated by a toggle lever 27, as shown in FIG. 2.

Additionally such lever may include a hole 28 therethrough and a slot 29 for permitting the fishing line 30 to be inserted through the hole as shown in FIG. 3. In this design the fishing aid is set up with the lamp not being turned on, however the fishing line is relooped through the end guide 31 of the pole before extending out to the water so that when the fish tugs the line, the lever is tripped to turn on the light.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. The combination of a fishing pole and a night time fishing aid, the fishing pole comprising an elongated rod having upper and lower ends, a loop guide extending from the upper end, a fishing reel coupled to the lower end, a fishing line spanning the rod from the fishing reel and extending from the upper end of the rod; the fishing aid comprising a case, clip means on the case for mounting it onto the elongated rod adjacent said upper end, a battery in said case, a lamp in said case and visably extending therefrom, a toggle switch in said case, an electric circuit interconnecting said lamp, battery and toggle switch such that when said toggle switch is turned on said lamp remains lit, said toggle switch having a toggle lever extending upwardly from said case with its on position angularly directed towards said rod and its off position being angularly directed away from said rod, an elongated opening formed in said toggle lever, a slot in said toggle lever to facilitate entry into said elongated opening, said fishing line passing upwardly along said elongated rod, then downwardly through said loop guide, through said elongated opening in said toggle lever, back upwardly through said loop guide and then extending from said elongated pole, whereby pulling on the extended fishing line causes said toggle lever to move from its off position to its on position to thereby turn on the lamp.

* * * * *